(12) United States Patent
Ulicny et al.

(10) Patent No.: US 7,306,083 B2
(45) Date of Patent: Dec. 11, 2007

(54) MAGNETORHEOLOGICAL FLUID DEVICE (75) Inventors: John C. Ulicny, Oxford, MI (US); Daniel J. Klingenberg, Stoughton, WI (US); Anthony L. Smith, Troy, MI (US); Mark A. Golden, Washington, MI (US)

(73) Assignees: GM Global Technology Operations, Inc., Detroit, MI (US); Wisconsin Alumni Research Foundation, Madison, WI (US)

( * ) Notice: Subject to any disclaimer, the term of this patent is extended or adjusted under 35 U.S.C. 154(b) by 209 days.

(21) Appl. No.: 11/190,422

(22) Filed: Jul. 27, 2005

(65) Prior Publication Data

US 2007/0023247 A1 Feb. 1, 2007

(51) Int. Cl.
*F16D 35/00* (2006.01)
(52) U.S. Cl. .................................... 192/21.5
(58) Field of Classification Search ............. 188/267.2
See application file for complete search history.

(56) References Cited

U.S. PATENT DOCUMENTS

| | | | | |
|---|---|---|---|---|
| 2,745,527 A | * | 5/1956 | Winther | 192/21.5 |
| 2,756,852 A | * | 7/1956 | Findley | 192/21.5 |
| 2,832,449 A | * | 4/1958 | Winther | 192/21.5 |
| 6,032,772 A | | 3/2000 | Moser | 192/21.5 |
| 6,173,823 B1 | | 1/2001 | Moser | 192/21.5 |
| 6,318,531 B1 | | 11/2001 | Usoro | 192/21.5 |
| 6,412,618 B1 | * | 7/2002 | Stretch et al. | 192/21.5 |
| 6,581,739 B1 | * | 6/2003 | Stretch et al. | 192/21.5 |
| 6,619,453 B2 | | 9/2003 | Stretch | 192/21.5 |
| 6,634,344 B2 | | 10/2003 | Stretch | 123/559.3 |
| 6,837,350 B2 | * | 1/2005 | Stretch et al. | 192/21.5 |

OTHER PUBLICATIONS

Morris, Jeffrey et al., "Curvilinear flows of noncolloidal suspensions: The role of normal stresses", J. Rheol. 43(5), Sep./Oct. 1999: 1213-1237.
von Pfeil, Karl, "A Two-Fluid Continuum Model for Structure Evolution in Electro- and Magnetorheological Fluids", M.S. Thesis, University of Wisconsin—Madison: 2002.

* cited by examiner

*Primary Examiner*—Rodney H. Bonck (57) ABSTRACT

A device employing a magneto rheological (MR) fluid in combination with a stator and a rotor is disclosed, where the stator includes a magnetic field generator. The rotor has a rotational axis and a rotational degree of freedom with respect to the stator. The stator and rotor define an annular space therebetween and are coupled via the MR fluid disposed within the annular space, and the magnetic field generator is in field communication with the MR fluid at the annular space. The device includes a means for promoting the formation of stationary stripes of MR fluid within the annular space in response to rotation of the rotor.

20 Claims, 6 Drawing Sheets

MAGNETORHEOLOGICAL FLUID DEVICE

BACKGROUND OF THE INVENTION

The present disclosure relates generally to magneto rheological fluid (MR) devices, and particularly to a MR clutch having high torque transfer capability.

MR fluids are a suspension of magnetizable particles, typically pure iron in the micron particle size range, suspended in a carrier fluid, typically a hydrocarbon oil. When this fluid is exposed to a magnetic field, the yield stress of the MR fluid increases by several orders of magnitude. This yield stress change is produced by the formation of columns of magnetizable particles across the gap containing the fluid in the direction of the applied magnetic field. This increase in yield stress can be used to control the fluid coupling between two rotating members, such as in a clutch, or change the flow rate of the fluid through a pipe, channel, or orifice. This change in yield stress is rapid, taking place in milliseconds, and reversible. Since the magnetic field can be rapidly controlled by the application of a current to a field coil, the yield stress of the fluid, and thus the clutch torque, for example, can be changed just as rapidly.

In an effort to utilize this phenomenon, MR clutches have been developed. However, MR clutches suffer from a number of drawbacks, one of which is the relatively low torque density compared to other technologies such as hydraulically actuated clutches, and another is the amount of electrical power consumption required to effect a desired torque transfer via the MR fluid for a given device size. This results in large clutches and/or high power consumption. Accordingly, there is a need in the art to provide MR devices, such as a MR clutch, having improved torque transfer capability and efficiency.

BRIEF DESCRIPTION OF THE INVENTION

Embodiments of the invention include a device employing a magneto rheological (MR) fluid in combination with a stator, a rotor, and a magnetic field generator. As used herein, the term stator may also include the magnetic field generator, since the two have the same speed of rotation. The rotor has a rotational axis and a rotational degree of freedom with respect to the stator. The stator and rotor define an annular space therebetween and are coupled via the MR fluid disposed within the annular space, and the magnetic field generator is in field communication with the MR fluid at the annular space. The device includes a means for forming stationary stripes of MR fluid within the annular space in response to rotation of the rotor.

Other embodiments of the invention include a magneto rheological (MR) fluid coupling for effecting torque with respect to a shaft capable of rotary motion. The coupling includes a stator and a rotor, with the stator including a magnetic field generator. The rotor has a rotational axis and a rotational degree of freedom with respect to the stator, and is configured for physical communication with the shaft. The stator and rotor define an annular space therebetween and are coupled via a MR fluid disposed within the annular space. The magnetic field generator is in field communication with the MR fluid and is disposed to produce a substantially radially directed magnetic field across the annular space. The rotor is rotationally responsive to the application of a magnetic field at the MR fluid. The stator, the rotor, or both the rotor and the stator is/are configured to form stationary stripes of MR fluid within the annular space in response to rotation of the rotor.

BRIEF DESCRIPTION OF THE DRAWINGS

Referring to the exemplary drawings wherein like elements are numbered alike in the accompanying Figures.

DETAILED DESCRIPTION OF THE INVENTION

Disclosed herein are exemplary MR fluid devices suitable for use in MR fluid clutches, for example, having a drum-shaped rotor arranged with a cylindrical stator to define an annular space therebetween, a magnetic field generator for developing a magnetic field across the annular space, and MR fluid disposed within the annular space. The combination of field generator, rotor and stator, includes structure capable of promoting the formation of stationary stripes of MR fluid within the annular space in response to rotation of the rotor and application of the magnetic field. In an exemplary embodiment, such structure includes ring-like flow channels formed at the surface of the drum shaped rotor and/or cylindrical stator.

Exemplary couplings may employ single or multiple coils embedded in the stationary magnetic core to provide a magnetic field across the MR fluid so as to vary the torque transmitted between the members being coupled. Solid non-magnetic portions may be utilized to hold parts of the magnetic circuit on the stator and the rotor portions. A sealing arrangement may also be provided to prevent the MR fluid from leaking away from the working gap.

An exemplary MR fluid composition generally comprises. magnetizable particles, a carrier fluid and additives. The magnetizable particles of the MR fluid composition are comprised of, for example, paramagnetic, superparamagnetic, or ferromagnetic compounds or a combination comprising at least one of the foregoing compounds. Examples of specific magnetizable particles are particles comprised of materials such as iron, iron oxide, iron nitride, iron carbide, carbonyl iron, chromium dioxide, low carbon steel, silicon steel, nickel, cobalt, or the like, or a combination comprising at least one of the foregoing. The iron oxide includes all forms of pure iron oxide, such as, for example, $Fe_2O_3$ and $Fe_3O_4$, as well as those containing small amounts of other elements, such as, manganese, zinc or barium. Specific examples of iron oxide include ferrites and magnetites. In addition, the magnetizable particles can be comprised of alloys of iron, such as, for example, those containing aluminum, silicon, cobalt, nickel, vanadium, molybdenum, chromium, tungsten, manganese, copper, or a combination comprising at least one of the foregoing metals.

The magnetizable particles may also be comprised of specific iron-cobalt and iron-nickel alloys. Exemplary iron-cobalt alloys have an iron to cobalt ratio ranging from about 30:70 to about 95:5. In an embodiment, the iron-cobalt alloys have an iron to cobalt ratio ranging from about 50:50 to about 85:15. The iron-nickel alloys have an iron to nickel ratio ranging from about 90:10 to about 99:1. In an embodiment, the iron-nickel alloys have an iron to cobalt ratio ranging from about 94:6 to about 97:3. The aforementioned iron-cobalt and iron-nickel alloys may also contain a small amount of additional elements, such as, for example, vanadium, chromium, or the like, in order to improve the ductility and mechanical properties of the alloys.

These additional elements are typically present in an amount that is less than about 3.0% by weight, based on the total weight of the magnetizable particles. Examples of the commercially available iron-cobalt alloys are HYPERCO® from Carpenter Technology, HYPERM® from F. Krupp Widiafabrik, SUPERMENDUR® from Arnold Engineering and 2V-PERMENDUR® from Western Electric.

The magnetizable particles are generally obtained from processes involving the reduction of metal oxides, grinding or attrition, electrolytic deposition, metal carbonyl decomposition, rapid solidification, or smelt processing. Examples of suitable metal powders that are commercially available are straight iron powders, reduced iron powders, insulated reduced iron powders, cobalt powders, or the like, or a combination comprising at least one of the foregoing metal powders. Alloy powders can also be used. A suitable example of an alloy powder is one comprising 48 wt % iron, 50 wt % cobalt and 2 wt % vanadium from UltraFine Powder Technologies.

Exemplary magnetizable particles are those that contain a majority of iron in any one of its chemically available forms. Carbonyl iron powders that are made by the thermal decomposition of iron pentacarbonyl are generally desirable for use in a MR fluid composition. Carbonyl iron of the preferred form is commercially available from ISP Technologies, GAF Corporation and/or BASF Corporation.

The magnetizable particles generally have an aspect ratio of about 1 and have an average particle size of about 0.1 micrometers to about 500 micrometers. In an embodiment, the magnetizable particles have an average particle size of about 1 micrometer to about 250 micrometers. In another embodiment, the magnetizable particles have an average particle size of about 10 micrometers to about 100 micrometers. In yet another embodiment, the magnetizable particles have an average particle size of about 20 micrometers to about 80 micrometers. The magnetizable particles may have a bimodal or higher (n-modal for example, where n is equal to or greater than 3) particle size distribution. High aspect ratio magnetizable particles having an aspect ratio of greater than or equal to about 1.5 may also be used if desired.

The number of magnetizable particles in the MR fluid composition depends upon the desired magnetic activity and viscosity of the fluid, but may be from about 0.01 to about 60 volume percent, based on the total volume of the MR fluid composition. In one embodiment, the number of magnetizable particles in the MR fluid composition may be from about 1.5 to about 50 volume percent, based on the total volume of the MR fluid composition.

The carrier fluid forms the continuous phase of the MR fluid composition. Examples of suitable carrier fluids are natural fatty oils, mineral oils, polyα-olefins, polyphenylethers, polyesters (such as perfluorinated polyesters, dibasic acid esters and neopentylpolyol esters), phosphate esters, synthetic cycloparaffin oils and synthetic paraffin oils, unsaturated hydrocarbon oils, monobasic acid esters, glycol esters and ethers (such as polyalkylene glycol), synthetic hydrocarbon oils, perfluorinated polyethers, halogenated hydrocarbons, or the like, or a combination comprising at least one of the foregoing carrier fluids.

Exemplary carrier fluids are those which are non-volatile, non-polar and do not contain amounts of water greater than or equal to about 5 wt %, based upon the total weight of the carrier fluid. Examples of hydrocarbons are mineral oils, paraffins, or cycloparaffins. Synthetic hydrocarbon oils include those oils derived from oligomerization of olefins such as polybutenes and oils derived from high molecular weight alpha olefins having about 8 to about 20 carbon atoms by acid catalyzed dimerization and by oligomerization using trialuminum alkyls as catalysts.

The carrier fluid is generally present in an amount of about 40 to about 99.999 volume percent, based upon the total volume of the MR fluid composition. In an embodiment, the carrier fluid is generally present in an amount ranging from about 50 to about 99 volume percent, based upon the total volume of the MR fluid composition.

The MR fluid composition may optionally include other additives such as a thixotropic agent, a carboxylate soap, an antioxidant, a lubricant, a viscosity modifier, a sulfur-containing compound, a ZDDP-type compound, or a combination comprising at least one of the foregoing additives. If present, these optional additives may be present in an amount of about 0.25 to about 10 volume percent, based upon the total volume of the MR fluid. In an embodiment, these optional additives are present in an amount of about 0.5 to about 7.5 volume percent, based upon the total volume of the MR fluid. Exemplary thixotropic agents include polymer-modified metal oxides. The polymer-modified metal oxide may be prepared by reacting a metal oxide powder with a polymeric compound that is compatible with the carrier fluid and capable of shielding substantially all of the hydrogen-bonding sites or groups on the surface of the metal oxide from any interaction with other molecules. Examples of suitable metal oxide powders include precipitated silica gel, fumed or pyrogenic silica, silica gel, titanium dioxide, and iron oxides such as ferrites or magnetites, or the like, or a combination comprising at least one of the foregoing metal oxide powders.

Examples of suitable polymeric compounds useful in forming the polymer-modified metal oxides include thermosetting polymers, thermoplastic polymers or combinations of thermosetting polymers with thermoplastic polymers. Examples of polymeric compounds are oligomers, polymers, copolymers such as block copolymers, star block copolymers, terpolymers, random copolymers, alternating copolymers, graft copolymers, or the like, dendrimers, ionomers, or the like, or a combination comprising at least one of the foregoing. Examples of suitable polymers are polyacetals, polysiloxanes, polyurethanes, polyolefins, polyacrylics, polycarbonates, polyalkyds, polystyrenes, polyesters, polyamides, polyaramides, polyamideimides, polyarylates, polyarylsulfones, polyethersulfones, polyphenylene sulfides, polysulfones, polyimides, polyetherimides, polytetrafluoroethylenes, polyetherketones, polyether etherketones, polyether ketone ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polysiloxanes, phenolics, epoxies, or combinations comprising at least one of the foregoing organic polymers.

A polymer-modified metal oxide, in the form of fumed silica treated with a siloxane oligomer, can be commercially obtained under the trade names AEROSIL® and CABO-SIL® from DeGussa Corporation and Cabot Corporation, respectively.

Examples of the carboxylate soap include lithium stearate, lithium-12-hydroxystearate, calcium stearate, aluminum stearate, ferrous oleate, ferrous stearate, zinc stearate, sodium stearate, strontium stearate, or the like, or a combination comprising at least one of the foregoing carboxylate soaps.

Examples of sulfur-containing compounds include thioesters such as tetrakis thioglycolate, tetrakis(3-mercaptopropionyl) pentaerithritol, ethylene glycoldimercaptoacetate, 1,2,6-hexanetriol trithioglycolate, trimethylol ethane tri(3-mercaptopropionate), glycoldimercaptopropionate, bisthioglycolate, trimethylolethane trithioglycolate, trimethylolpropane tris(3-mercaptopropionate) and similar compounds and thiols such as 1-dodecylthiol, 1-decanethiol, 1-methyl-1-decanethiol, 2-methyl-2-decanethiol, 1-hexadecylthiol, 2-propyl-2-decanethiol, 1-butylthiol, 2-hexadecylthiol, or the like, or a combination comprising at least one of the foregoing sulfur-containing compounds.

In general, it is desirable for the MR fluid composition to have a viscosity of about 50 to about 500 centipoise at 40° C. in the off-state. On-state yield stresses for MR fluid compositions are about 10 to about 100 kilopascals (about 1.5 to about 15 pound per square inch). These yield stresses would be measured at magnetic flux densities on the order of about 1 to about 2 tesla (that is, when the particles are magnetically saturated).

Figure 1:
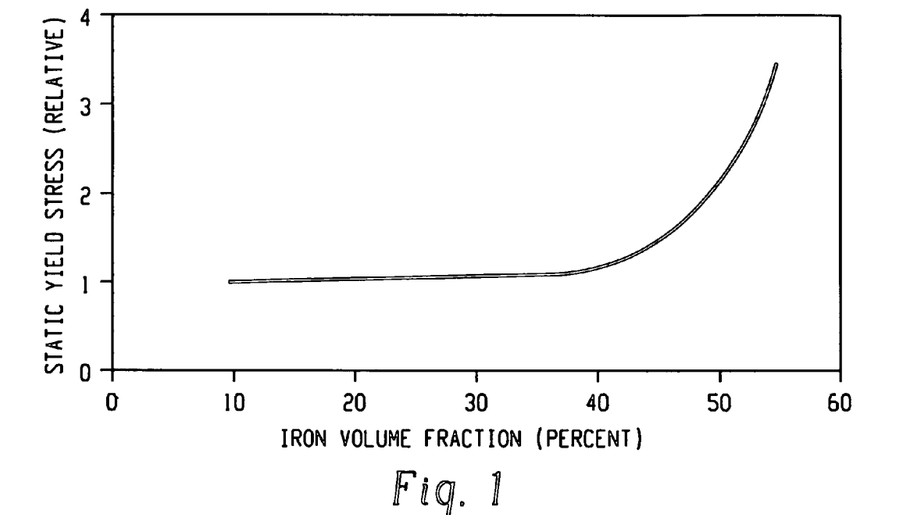
FIG. 1 illustrates a static yield stress characteristic as a function of percent iron volume fraction for an exemplary MR fluid for use in accordance with an embodiment of the invention.

It has been observed that when the MR fluid is in shear flow and exposed to a sufficiently high magnetic field, the columns of magnetic particles within the MR fluid will coalesce into "stripes" or bands of particles with a high concentration. This stripe formation results in an increase in the apparent viscosity of the MR fluid, which can be as much as two to ten times larger than that of the same MR fluid without stripes. This increase in apparent yield stress or viscosity can occur because of the non-linear relationship between the static yield stress and volume fraction of magnetizable particles in the MR fluid as shown in FIG. 1, which illustrates relative static yield stress as a function percent iron volume fraction of an exemplary MR fluid. Theory indicates that the particle concentration in a stripe can rise to a maximum packing density (see, for example, Karl von Pfeil, "A Two-Fluid Continuum Model For Structure Evolution In Electro- and Magneto rheological Fluids", M.S. Thesis, University of Wisconsin-Madison, 2002), which has been estimated to be between 0.6 and 0.85 for spherical magnetizable particles. FIG. 1 suggests that yield stress increases, with a corresponding torque increase in a clutch, for example, on the order of 2-4 times would be reasonable.

In an exemplary embodiment, the active gap is configured so as to promote the formation of stripes at lower overall apparent magnetic flux densities. On one or both sides of the gap are protrusions, indentations or grooves, either periodic or random, that effectively create a smaller gap at the location of the protrusion, or high point of the groove.

Figure 2:
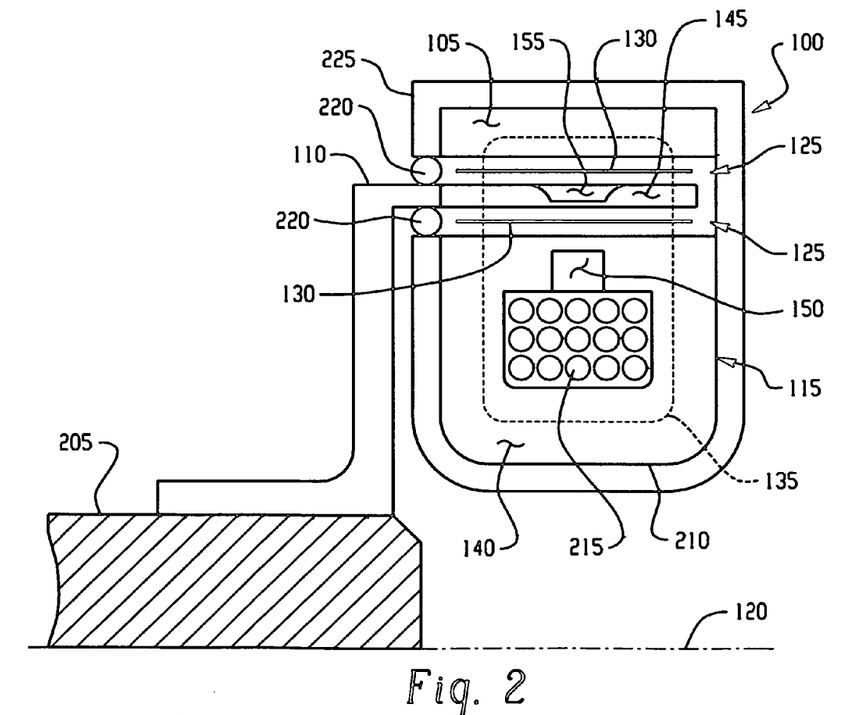
FIG. 2 depicts in cross section block view an exemplary MR fluid device in accordance with an embodiment of the invention.

Referring now to FIG. 2, a MR fluid device 100 is depicted having a stator 105, a rotor 110, and a magnetic field generator 115. As previously discussed, the stator 105 and the magnetic field generator 115 may collectively be referred to as the stator. MR fluid device 100 is also herein referred to as a MR fluid coupling, or a MR fluid clutch. The rotor 110, having a rotational degree of freedom with respect to the stator 105, is in direct mechanical communication with a shaft 205 that has a rotational axis 120. The stator 105 and rotor 110 define an annular space (depicted generally by reference numeral. 125, but discussed in more detail below), and are coupled via a MR fluid 130, depicted generally by solid lines, disposed within the annular space 125. The magnetic field generator 115 is in field communication with the MR fluid 130 at the annular space 125, which is illustrated generally by flux lines 135. Stator 105 and rotor 110 include magnetic portions 140, 145 and non-magnetic portions 150, 155, which serve to guide the magnetic field in a manner suitable for the purposes disclosed herein. Magnetic portion 140 is also herein referred to as a stator portion of the magnetic field generator 115. Suitable magnetizable materials include but are not limited to iron, steel, carbonyl iron, or the like, or a combination comprising at least one of the foregoing magnetizable materials. Suitable non-magnetic materials include but are not limited to stainless steel, aluminum, brass, plastics, or the like, or a combination comprising at least one of the foregoing non-magnetic materials. Alternatively, an air gap may be employed in place of or in addition to the use of non-magnetic portions.

Magnetic field generator 115 includes a stationary magnetic core 210, and a field coil 215 that is energized via external leads and power source (not shown but well known in the art). Exemplary oil seals 220 serve to prevent leakage of the MR fluid 130 from annular space 125. While exemplary oil seals 220 are depicted in a certain arrangement in FIG. 2, it will be appreciated that this is for illustration purposes only and that other arrangements may also be employed. A housing 225 may be employed for retaining parts of the MR fluid device 100.

A surface of stator 105 and/or rotor 110 exposed to annular space 125 includes a means for forming stationary stripes of MR fluid within the annular space 125 in response to rotation of the rotor 110, which will now be described with reference to FIGS. 3-7.

Figure 3:
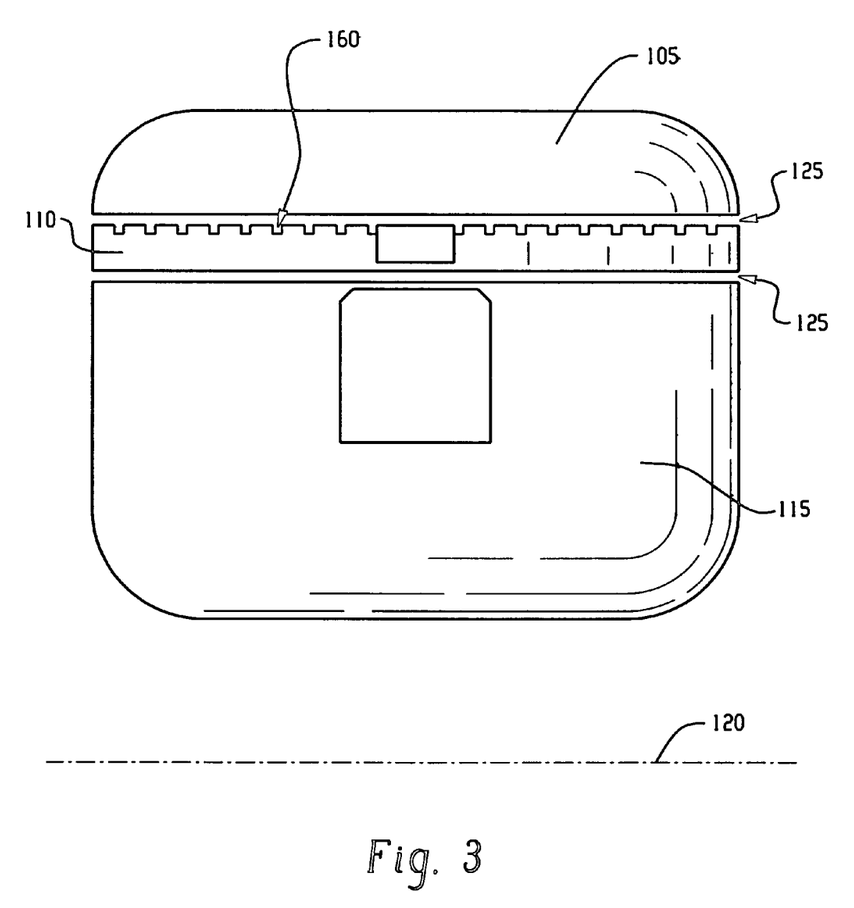
FIGS. 3-7 depict alternative exemplary embodiments of a portion of the MR fluid device of FIG. 2.

In FIG. 3, exemplary stator 105, rotor 110 and magnetic field generator 115 are depicted in cross section view in relationship to rotational axis 120. In an embodiment, rotor 110 is drum shaped, stator 105 is cylindrically shaped to define a cylindrical surface outboard of rotor 110, and magnetic field generator 115 is disposed inboard of rotor 110 to define another cylindrical surface thereat. With rotor 110 being disposed between stator 105 and magnetic field generator 115, a double annular space 125 results, in which is disposed the MR fluid 130.

Viewed another way, the cylindrical geometries of stator 105 and magnetic field generator 115 about axis 120 define a first pair of concentric cylindrical, surfaces that serve to define an annular space. The cylindrical geometry of rotor 110 about axis 120 defines a second pair of concentric cylindrical surfaces that are disposed between the first pair of concentric cylindrical surfaces, which serves to define the double annular space 125, in which is disposed the MR fluid 130.

As illustrated, the outboard surface of rotor 110, that is, the surface exposed to annular space 125 and facing stator 105, includes grooves 160 that form flow channels (also referred to by reference numeral 160) for the MR fluid 130. The flow channels 160 are ring shaped, parallel to each other, and encircle rotational axis 120 in a continuous manner. As such, and in response to rotation of rotor 110 about axis 120, the rotational path that ring shaped flow channels 160 follow does not vary in the axial direction. In other words, the rings defined by the flow channels 160 are stationary, even though the MR fluid 130 within the flow channels 160 may flow circumferentially about axis 120, in response to rotation of rotor 110 about axis 120.

As previously discussed, it has been observed that when the MR fluid 130 is in shear flow and exposed to a sufficiently high magnetic field, the columns of magnetic particles within the MR fluid 130 will coalesce into "stripes" or bands of particles with a high concentration. This stripe formation results in an increase in the apparent viscosity of the MR fluid 130. By employing stationary ring shaped flow channels 160 as herein disclosed, the magnetic field at the high points of the channels is intensified, which in turn intensifies this striping phenomena. Accordingly, the stationary ring shaped flow channels 160 are viewed as a means for forming stationary stripes of MR fluid 130. As a result, the apparent viscosity of the MR fluid 130 and the torque transfer characteristics of MR fluid device 100 are enhanced.

Figure 4:
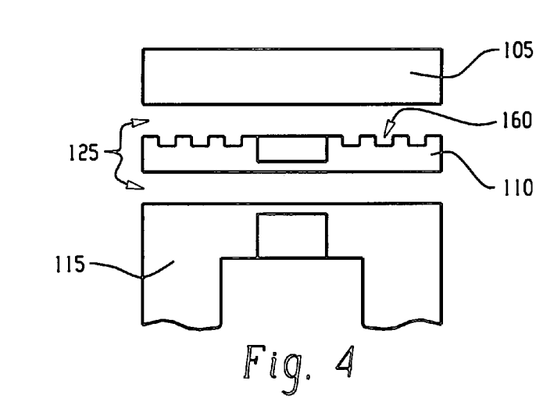

Referring now to FIGS. 4-7, alternative embodiments of flow channels 160 are depicted. For comparative purposes, FIG. 4 depicts a similar arrangement of flow channels 160 as depicted in FIG. 3, that is, with flow channels 160 disposed on an outboard surface of rotor 110 exposed to annular space 125 and facing stator 105.

Figure 5:
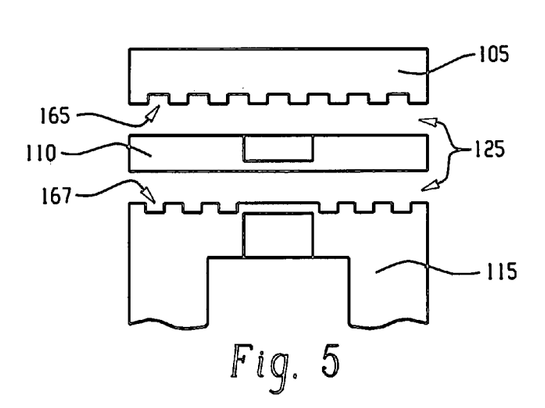
Figure 6:
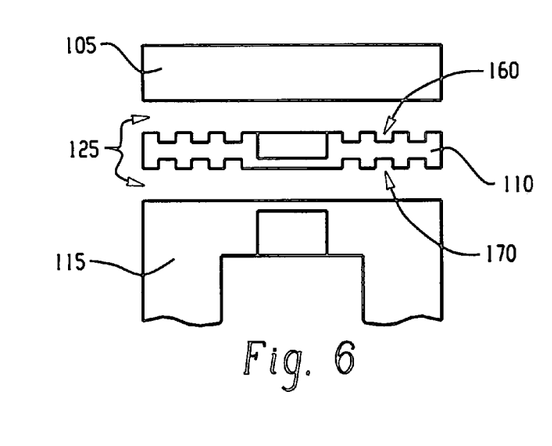
Figure 7:
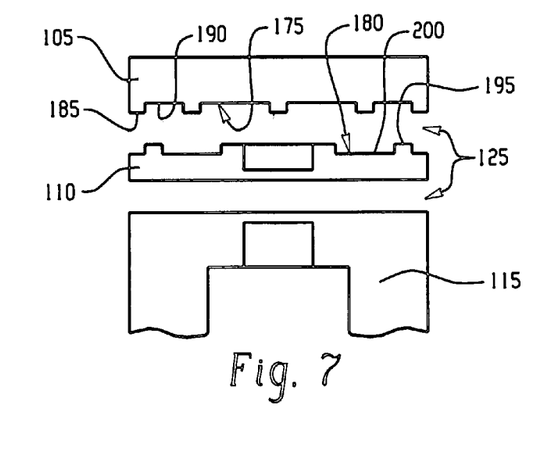

In FIG. 5, an alternative embodiment includes flow channels 165 disposed on an inboard surface of stator 105 exposed to annular space 125 and facing rotor 110. As discussed previously, the term stator may also include the magnetic field generator, since the two have the same speed of rotation. Accordingly, flow channels 167 may be disposed on the outboard surface of magnetic field generator 115 exposed to annular space 125 and facing rotor 110. In FIG. 6, another alternative embodiment includes flow channels 160 and flow channels 170, where flow channels 160 are disposed as described previously, and flow channels 170 are disposed on an inboard surface of rotor 110 exposed to annular space 125 and facing field generator 115. In FIG. 7, a further alternative embodiment includes flow channels 175 disposed in a similar manner as flow channels 165, and flow channels 180 disposed in a similar manner as flow channels 160. However, flow channels 175 and 180 are staggered with respect to each other, thereby resulting in a high point of flow channel 175 facing a low point of flow channel 180, and vice versa. Said another way, flow channels 175 may be viewed as having land surfaces 185 and groove surfaces 190, and flow channels 180 may be viewed as having land surfaces 195 and groove surfaces 200. Thus, and with reference still to FIG. 7, an embodiment of the invention includes a rotor land surface 195 facing a stator groove surface 190, and a stator land surface 185 facing a rotor groove surface 200.

From the foregoing it will be appreciated that embodiments of the invention may have a variety of arrangements of flow channels 160, 165, 170, 175, which may be arranged with a periodicity in the direction of axis 120, or may be randomly arranged and differently sized, as long as the flow channels are capable of forming parallel stationary rings of stationary stripes of MR fluid 130 proximate an inboard or outboard surface of drum shaped rotor 110 in response to the rotor 110 rotating about axis 120.

Figure 8:
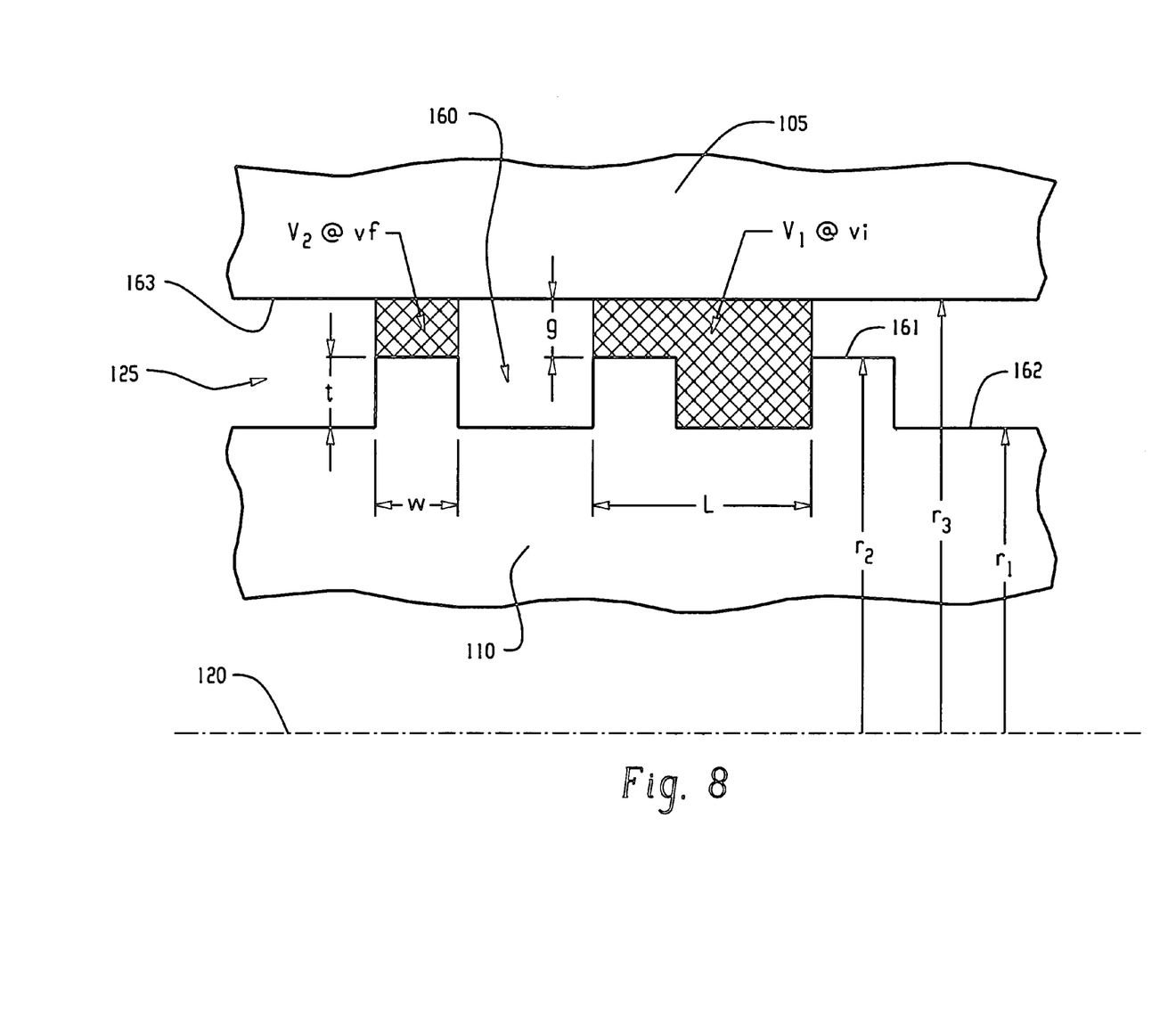
FIG. 8 depicts a magnified detail view of a portion of an exemplary MR fluid device in accordance with an embodiment of the invention.

Referring now to FIG. 8, a portion of stator 105 and rotor 110 are shown. Rotor 110 is depicted with flow channels 160 having land surfaces 161 and groove surfaces 162 exposed to annular space 125, and stator 105 is depicted having inboard surface 163 exposed to annular space 125. The radial distance from axis 120 to rotor groove surface 162 is $r_1$, the radial distance from axis 120 to rotor land surface 161 is $r_2$, and the radial distance from axis 120 to stator inboard surface 163 is $r_3$. The height of a rib (that is, the distance from rotor groove surface 162 to rotor land surface 161) is t, the width of a rotor land surface 161 is w, the smallest gap across annular space 125 (that is, the distance from rotor land surface 161 to stator inboard surface 163) is g, and the periodicity of the flow channels 160 along the direction of axis 120 is L. While only one side of rotor 110 is depicted with flow channels 160, it will be appreciated from the earlier discussion that both sides of rotor 100 may contain flow channels, and/or stator 105 may contain flow channels, and/or magnetic field generator 115 may contain flow channels.

A first elemental volume V1 is shown having an initial volume fraction $v_i$ of MR fluid 130. This first elemental volume V1 represents that volume of annular space 125 in one period L that contains an initial volume fraction $v_i$ of magnetizable particles of MR fluid 130 in response to rotor 110 being stationary. In an embodiment, the initial volume fraction $v_i$ of MR fluid 130 is about 45%.

A second elemental volume V2 is shown having a maximum packing volume fraction $v_f$ of MR fluid 130. This second elemental volume V2 represents that volume of annular space 125 in one period L that contains a maximum packing volume fraction $v_f$ of magnetizable particles of MR fluid 130 in response to rotor 110 rotating about axis 120. In an embodiment, the maximum packing volume fraction $v_f$ of MR fluid 130 is about 64%. For ease of calculation, the volume fraction for the volume defined by (V1−V2) is considered to be 0%, that is, absent magnetizable particles and present only base fluid of the MR fluid 130.

The initial volume fraction $v_i$ in volume V1 is considered to be that volume fraction before striping, and the maximum packing volume fraction $v_f$ in volume V2 is considered to be that volume fraction after striping.

In order for the initial volume fraction $v_i$ to exist in volume V1 before striping, and the maximum packing volume fraction $v_f$ to exist in volume V2 after striping, $v_f*V2$ must be equal to $v_i*V1$. Thus, a preliminary estimate for optimally arranging the geometry of the flow channels 160 would be to arrange the flow channels 160 so as to satisfy the following relationship:

$$v_f/v_i = V1/V2 = 1 + [(r_3^2 - r_1^2)(L-w)/(r_3^2 - r_2^2)(w)]. \quad \text{Equation-1}$$

It is contemplated that there are optimal dimensions for an arrangement of flow channels 160 to obtain the maximum benefit from striping, however, it is also contemplated that an arbitrary arrangement and random sizing of individual flow channels may be beneficial. From the foregoing, it will be appreciated that Equation-1 is based on geometry alone, and that other considerations such as magnetic flux or fluid dynamics have not been included. As such, optimizing adjustments to Equation-1 are contemplated, resulting in the following relationship being contemplated as beneficial:

$$v_f/v_i \geq V1/V2, \text{ and} \quad \text{Equation-2}$$

$$v_f/v_i \geq 1 + [(r_3^2 - r_1^2)(L-w)/(r_3^2 - r_2^2)(w)]. \quad \text{Equation-3}$$

In an exemplary embodiment employing Equation-1, with
r1=117.25 mm (millimeters)
r2=117.75 mm
r3=118.5 mm
w=2 mm
vi=0.45 vf=0.64, the resulting value for L is

L=2.51 mm.

Figure 9:
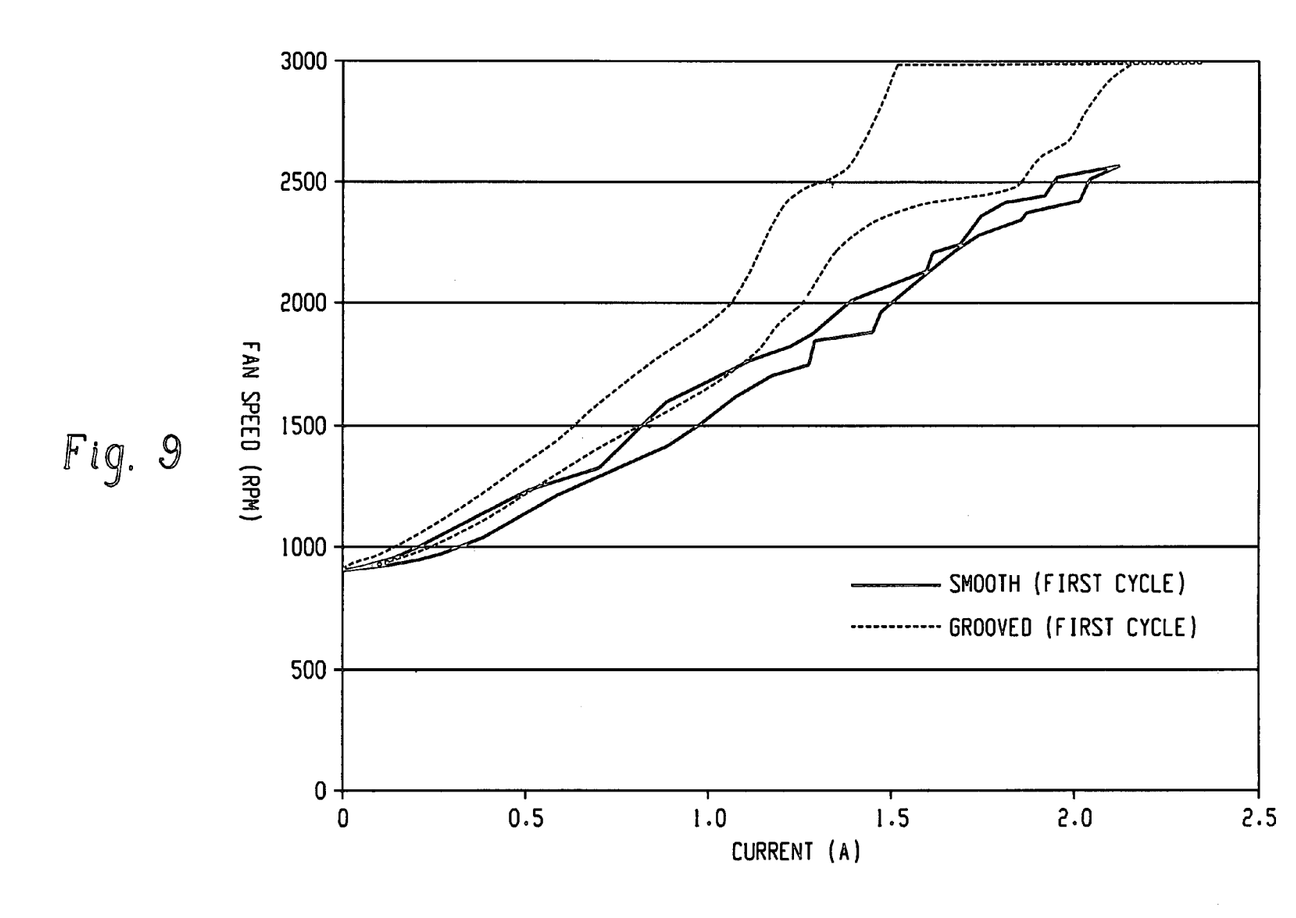
FIGS. 9 and 10 illustrate empirical data of an exemplary MR fluid device with and without the benefit of an embodiment of the invention.
Figure 10:
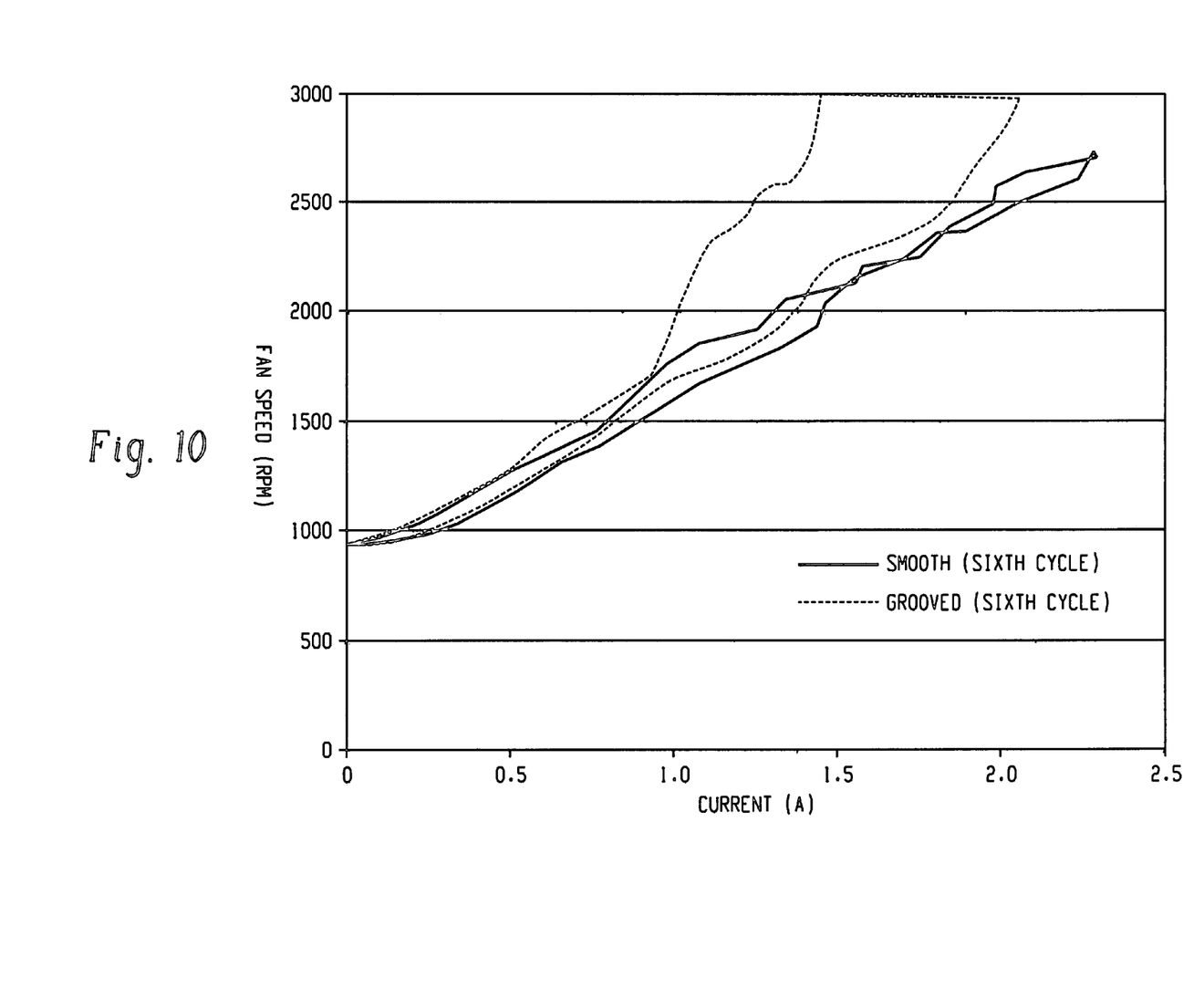

Empirical data showing the effect of striping is depicted in FIGS. 9 and 10, which illustrate a measured ramp up/ramp down output fan speed for two automotive MR fan clutches as a function of the input current to the coil of magnetic field generator, where the input drive speed to the clutch is 3000 revolutions per minute (rpm). The two clutches and the MR fluid were identical except that the rotor in one was grooved (dashed line curve) and in the other was smooth (solid line curve). FIG. 9 illustrates the respective fan characteristics at the first ramp up/ramp down cycle, and FIG. 10 illustrates the respective fan characteristics at the sixth ramp up/ramp down cycle. As illustrated, the fan speed for the clutch with the grooved rotor (dashed line curve) is shown as being able to reach the maximum input speed of 3000 rpm, which was the clutch lock-up condition, while the fan speed for the clutch with the smooth rotor (solid line curve) is shown being able to only reach a maximum speed of about 2500 rpm, at the maximum current applied of about 2.25 Amps (A), for both the first cycle and the sixth cycle.

As disclosed, some embodiments of the invention may include some of the following advantages: a grooved rotor MR clutch capable of delivering a higher torque transfer as compared to a smooth rotor MR clutch having the same size and electrical power input; a grooved rotor MR clutch capable of delivering the same torque transfer at a lower electrical power input as compared to a smooth rotor MR clutch of the same size; and, a smaller size grooved rotor MR clutch capable of delivering the same torque transfer as compared to a larger size smooth rotor MR clutch.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A device employing a magnetorheological (MR) fluid, the device comprising:

a stator; and a rotor concentrically aligned and rotatable with respect to the stator, the stator and rotor defining an annular space therebetween, wherein the MR fluid is operatively disposed within the annular space to selectively variably couple the rotor to the stator;

wherein the stator includes a magnetic field generator in field communication with the MR fluid at the annular space; and flow channels each defining at least three substantially flat surfaces in fluid communication with the MR fluid and thereby configured to form stationary stripes of MR fluid within the annular space in response to rotation of the rotor.

2. The device of claim 1, wherein:

the flow channels are formed at a surface of the rotor exposed to the annular space.

3. The device of claim 2, wherein:

the rotor and magnetic field generator define a second annular space therebetween, wherein the MR fluid is also operatively disposed within the second annular space to selectively variably couple the rotor to the magnetic field generator.

4. The device of claim 3, wherein:

the flow channels are also formed at a surface of at least one of the rotor and magnetic field generator exposed to the second annular space.

5. The device of claim 1, wherein:

the flow channels are formed at a surface of the stator exposed to the annular space.

6. The device of claim 5, wherein:

the rotor and magnetic field generator define a second annular space therebetween, wherein MR fluid is also operatively disposed within the second annular space to selectively variably couple the rotor to the magnetic field generator.

7. The device of claim 6, wherein:

the flow channels are also formed at a surface of at least one of the rotor and magnetic field generator exposed to the second annular space.

8. The device of claim 1, wherein:

the flow channels configured to form stationary stripes of MR fluid comprises first flow channels formed at a surface of the rotor exposed to the annular space, and second flow channels formed at a surface of the stator exposed to the annular space.

9. The device of claim 8, wherein:

the first flow channels are staggered with respect to the second flow channels.

10. The device of claim 9, wherein:

the first flow channels define land and groove surfaces at the rotor surface;

the second flow channels define land and groove surfaces at the stator surface;

a rotor land surface faces a stator groove surface; and a stator land surface faces a rotor groove surface.

11. The device of claim 1, wherein:

the rotor is drum shaped having a drum surface; and the flow channels define parallel stationary rings about the drum surface.

12. The device of claim 1, wherein:

the flow channels comprise a random arrangement of differently sized flow channels formed at a surface of at least one of the rotor and stator exposed to the annular space.

13. A device employing a magneto rheological (MR) fluid, the device comprising:

a stator; and a rotor concentrically aligned and rotatable with respect to the stator, the stator and rotor defining an annular space therebetween, wherein the MR fluid is operatively disposed within the annular space selectively variably couple the rotor to the stator;

wherein the stator includes a magnetic field generator in field communication with the MR fluid at the annular space; and flow channels in fluid communication with the MR fluid and configured to form stationary stripes of MR fluid within the annular space in response to rotation of the rotor;

wherein the flow channels are formed at a surface of the rotor exposed to the annular space, the flow channels defining land and groove surfaces at the rotor that satisfy the following relationship:

$$V1/V2 = 1 + [(r_3^2 - r_1^2)(L-w)/(r_3^2 - r_2^2)(w)], \text{ where:}$$

V1 is an elemental volume having an initial volume fraction of MR fluid prior to striping;

V2 is an elemental volume having a maximum packing volume fraction of MR fluid in response to striping;

$r_1$ is a radial distance from the axis to the rotor groove surface;

$r_2$ is a radial distance from the axis to the rotor land surface;

$r_3$ is a radial distance from the axis to the stator surface exposed to the annular space;

L is the periodicity of the flow channels with respect to the rotational axis of the rotor; and w is the axial length of a rotor land surface.

14. The device of claim 13, wherein:

the flow channels defining land and groove surfaces at the rotor satisfy the following relationship:

$$v_f/v_i \geq V1/V2, \text{ where:}$$

$v_f$ is the maximum packing volume fraction of the MR fluid; and $v_i$ is the initial volume fraction of the MR fluid.

15. A magneto rheological (MR) fluid coupling for effecting torque with respect to a shaft capable of rotary motion, the coupling comprising:

a stator; and a rotor concentrically aligned and rotatable with respect to the stator, the rotor being in operative communication with the shaft, the stator and rotor defining an annular space therebetween, wherein an MR fluid is operatively disposed within the annular space to selectively variably couple the rotor to the stator;

wherein the stator includes a magnetic field generator in field communication with the MR fluid to selectively produce a substantially radially directed magnetic field across the annular space;

wherein the rotor is rotationally responsive to the application of a magnetic field at the MR fluid; and wherein at least one of the stator and the rotor includes flow channels each defining at least three substantially flat surfaces in fluid communication with the MR fluid and thereby configured to form stationary stripes of MR fluid within the annular space in response to rotation of the rotor.

16. The coupling of claim 15, wherein:

the stator and magnetic field generator define a first pair of concentric cylindrical surfaces that further define the annular space;

the rotor defines a second pair of concentric cylindrical surfaces, the second pair of concentric cylindrical surfaces being disposed between the first pair of concentric cylindrical surfaces, thereby defining a double annular space, the MR fluid concentric cylindrical annular space; and the double annular space is oriented parallel to the rotational axis of the rotor.

17. The coupling of claim 16, further comprising:

flow channels formed at the surface of at least one the rotor and stator and configured to form stationary stripes of MR fluid within the double annular space in response to rotation of the rotor.

18. The coupling of claim 15, further comprising:

flow channels formed at the surface of at least one the rotor and stator and configured to form stationary stripes of MR fluid within the annular space in response to rotation of the rotor.

19. The coupling of claim 18, wherein:

the flow channels are uniformly arranged and similarly sized.

20. A device employing a magneto rheological (MR) fluid, the device comprising:

a stator including a magnetic field generator in field communication with the MR fluid;

a rotor concentrically aligned and rotatable with respect to the stator, the stator and rotor defining an annular space therebetween, wherein the MR fluid is operatively disposed within the annular space to selectively variably couple the rotor to the stator; and flow channels in fluid communication with the MR fluid and configured to form stationary stripes of MR fluid within the annular space in response of the rotor, wherein the flow channels are formed at a surface of the rotor exposed to the annular space, and wherein the flow channels define land and groove surfaces at the rotor that satisfy the following relationship:

$$V1/V2 = 1 + [(r_3^2 - r_1^2)(L-w)/(r_3^2 - r_2^2)(w)], \text{ and}$$

$$v_f/v_i \geq V1/V2, \text{ where}$$

V1 is an elemental volume having an initial volume fraction of MR fluid prior to striping;

V2 is an elemental volume having a maximum packing volume fraction of MR fluid in response to striping;

$r_1$ is a radial distance from the axis to the rotor groove surface;

$r_2$ is a radial distance from the axis to the rotor land surface;

$r_3$ is a radial distance from the axis to the stator surface exposed to the annular space;

L is the periodicity of the flow channels with respect to the rotational axis of the rotor;

w is the axial length of a rotor land surface;

$v_f$ is the maximum packing volume fraction of the MR fluid; and $v_i$ is the initial volume fraction of the MR fluid.

* * * * *